No. 12,585. REISSUED DEC. 25, 1906.

J. W. ARROWSMITH.

ARCH PROP.

APPLICATION FILED OCT. 6, 1906.

2 SHEETS—SHEET 1.

Inventor

James W. Arrowsmith

Witnesses

R. A. Brown

E. W. Cady

By A. P. Brady

Attorney

No. 12,585. REISSUED DEC. 25, 1906.

J. W. ARROWSMITH.

ARCH PROP.

APPLICATION FILED OCT. 6, 1906.

2 SHEETS—SHEET 2.

Witnesses

R. A. Brown

E. W. Cady

Inventor

James W. Arrowsmith

By A. P. Drury

Attorney

UNITED STATES PATENT OFFICE.

JAMES W. ARROWSMITH, OF MORRISTOWN, NEW JERSEY.

ARCH-PROP.

No. 12,585. Specification of Reissued Letters Patent. Reissued Dec. 25, 1906.

Original No. 815,897, dated March 20, 1906. Application for reissue filed October 6, 1906. Serial No. 337,810.

*To all whom it may concern:*

Be it known that I, JAMES W. ARROWSMITH, a citizen of the United States, residing at Morristown, in the county of Morris, State of New Jersey, have invented certain new and useful Improvements in Arch-Props, of which the following is a description, reference being had to the accompanying drawings, forming a part hereof.

My invention relates to instep-supports or arch-props designed to be worn inside of boots or shoes for supporting the arch of the instep to prevent its breaking down or, if weakened, to sustain the parts in normal position, and thus permit them to regain their normal condition; and my invention has for its object to provide a support or arch-prop which will properly support the arch of the instep and at the same time will be so far yielding as to avoid discomfort to the wearer.

With this object in view my invention comprises the use with a main plate of ordinary construction, which may or may not be provided with means for increasing its rigidity, of an auxiliary plate of resilient material of less thickness than the main plate secured on the upper face of the main plate and cushions interposed between the main plate and the auxiliary plate; and the invention consists in the construction and combination of elements hereinafter described, and particularly pointed out in the claims.

Figure 1:
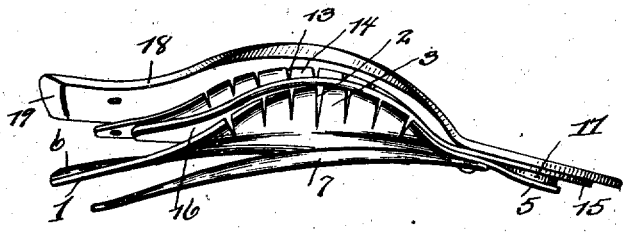
Figure 2:
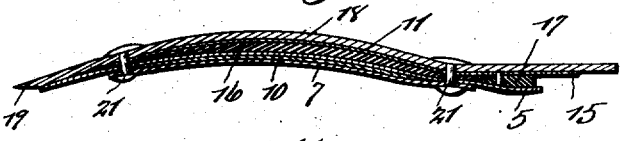
Figure 3:
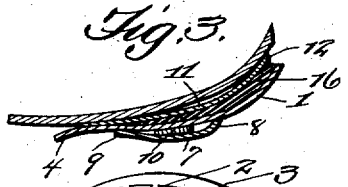
Figure 4:
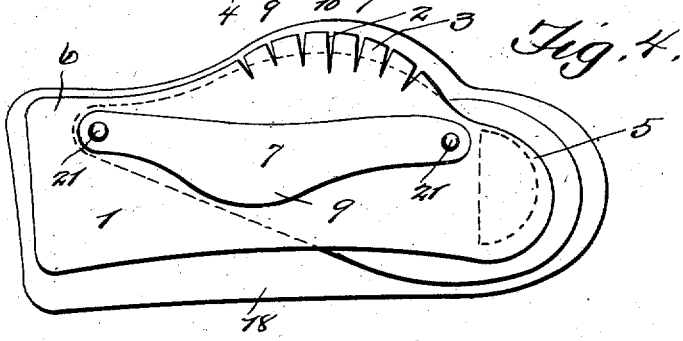
Figure 5:
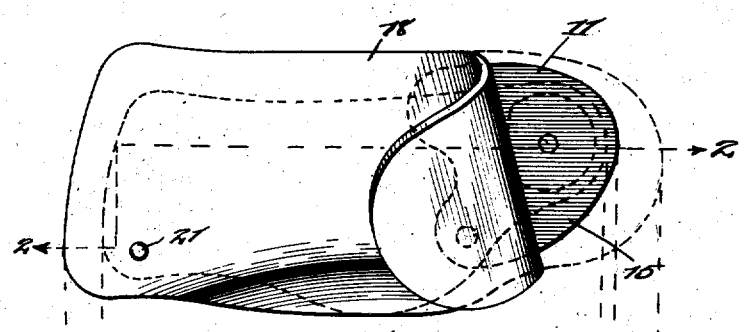
Figure 6:
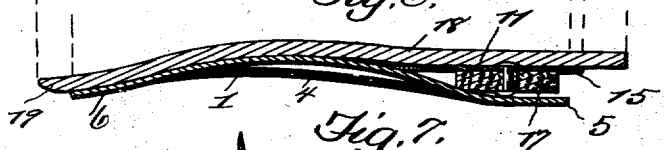
Figure 7:
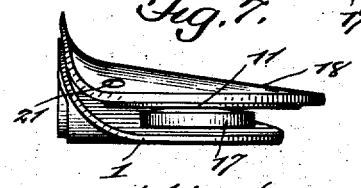
Figure 8:
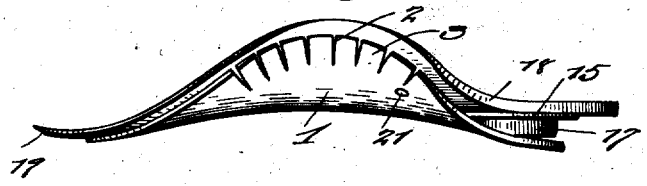

In the drawings, Figure 1 is a side view of the complete device with one of the fastening devices which hold the parts together removed. Fig. 2 is a longitudinal sectional view of the complete device. Fig. 3 is a cross-sectional view of the complete device. Fig. 4 is a bottom view of the complete device. Fig. 5 is a top plan view of a modified form of the device, the heel part of the covering being shown rolled forward to expose the parts beneath it. Fig. 6 is a longitudinal sectional view on line 2 2 of Fig. 5. Fig. 7 is an end view looking from the right of Fig. 5 with the covering shown in place, and Fig. 8 is a side view looking from the left of Fig. 5.

Referring to the drawings, 1 is the main plate of the instep-support or arch-prop. This main plate is arched lengthwise to conform to the under surface of the normal foot and has one side curved upward to fit the inside curve of the normal instep, the upwardly-curved side being made slightly yielding by slits 2, dividing it into tongues 3. The lengthwise arch of the main plate is greatest on the line which joins the body of the plate and the upturned edge and gradually lessens toward the opposite edge. The edge of the main plate opposite to the upwardly-curved edge is preferably curved downward, as shown at 4, this curve being greatest about midway of the length of the plate and gradually disappearing toward the heel end 5 and the front end 6 of the main plate, these ends being substantially flat. This downward curve or drop 4 is distinct from the gradual or normal downward trend of the plate toward the lower edge, as is clearly shown in Fig. 3, being bent or curved sharply downward from a point near the lower edge to the edge, the downwardly-bent portion forming, in effect, a brace materially strengthening the plate against the tendency of the weight of the wearer to crush the longitudinal arch of the plate. The main plate is preferably provided on its under side with a plate 7, having its ends secured to the main plate, as hereinafter described, and having its edge on the side corresponding to the upturned edge of the main plate curved upward, as shown at 8, to fit the concave of the lengthwise arch of the main plate. The brace-plate 7 is broadest about midway of its length, so as to bear at a point 9 opposite the upturned edge 8 against the under surface of the main plate. A strip 10 of relatively stiff metal is preferably interposed between the brace-plate and the under side of the main plate to further brace it.

11 is an auxiliary plate made of resilient material of less thickness than the main plate and arranged to be secured upon its upper face. This auxiliary plate has its edge 12 upturned to correspond with the upturned edge of the main plate, and this upturned edge is divided by slits 13 into tongues 14. The auxiliary plate is cut away on the side opposite its upturned edge on a line at an angle to the longitudinal line, and at its rear or heel end 15 the plate is of greater breadth than the heel end of the main plate and also extends rearward beyond the heel end of the main plate.

Between the tongues 14 of the auxiliary plate 11 and the tongues 3 of the main plate a cushion, preferably consisting of a strip 16 of soft rubber, is interposed, and between the heel portion 15 of the auxiliary plate and the heel portion of the main plate a cushion, preferably consisting of a block or piece 17 of soft rubber, is interposed, the cushion being preferably held in place by being riveted or otherwise secured to the auxiliary plate.

Above the upper face of the auxiliary plate 11 the device is preferably provided with a covering 18 of non-metallic material, preferably sole-leather, molded to fit the upper surface of the device and secured thereto. This covering is of such shape and size as to extend beyond the lines of the plates 1 and 11 in front and rear and on both sides. This covering is preferably beveled off at its front end, as shown at 19, and also at its side next the tongues 14. This covering is preferably secured to the device at two points only, so as to leave its sides and ends free, rivets 21, arranged about on the line at which the upturned edge of the main plate joins the body of the main plate, being the preferred means for securing the covering in place. The rivets 21 also serve to secure the auxiliary plate 11 and the brace-plate 7 to the main plate 1. One or both of the holes in the main plate, through which the rivets pass, are preferably elongated sufficiently to permit the main plate to move slightly with reference to the brace-plate and auxiliary plate, so that the main plate may be shaped as may be necessary to adapt it to the foot of the wearer.

The cushion-strip 16 is held in position by securing the auxiliary plate in place, being pinched between the auxiliary plate and the main plate.

It will be apparent that in the construction as above described the main plate 1, with the brace-plate 7 and the metal strip 10, forms a substantially rigid base, the only yielding permitted being the slight yielding of the tongues 3. At the same time by reason of the auxiliary plate 11 and the cushions interposed between this auxiliary plate and the main plate the foot of the wearer is yieldingly supported at the points where the most pressure comes—that is, on the heel and on the side of the instep—and the discomfort of a rigid support is thus avoided. At the same time any undue yielding is checked by the main plate.

In Figs. 5 to 8, inclusive, I have shown a construction in which the heel only is cushioned. In this construction the auxiliary plate 11 is cut away, so that it overlies only the heel portion of the main plate, and the covering 18 is in direct contact with the tongues 3.

It will of course be understood that I do not desire to be limited to the particular materials described or to the particular form of the several parts shown.

Having thus described my invention, what I claim, and desire to secure by Letters Patent, is—

1. In an arch-prop or instep-support the combination of a main plate curved to fit the arch of the instep having one side upturned to fit the side curve of the instep and having a heel portion, an auxiliary plate secured to the upper face of the main plate and having a heel portion and a cushion of resilient material between the heel portion of the auxiliary plate and the heel portion of the main plate, substantially as described.

2. In an arch-prop or instep-support the combination of a main plate curved to fit the arch of the instep having one side upturned to fit the side curve of the instep and having a heel portion, an auxiliary plate secured at its forward end to the upper face of the main plate and having a heel portion and a cushion of resilient material between the heel portion of the auxiliary plate and the heel portion of the main plate substantially as described.

3. In an arch-prop or instep-support the combination of a main plate curved to fit the arch of the instep having one side upturned to fit the side curve of the instep and having a heel portion, an auxiliary plate of resilient metal secured to the upper face of the main plate and having a heel portion, and a cushion of resilient material between the heel portion of the auxiliary plate and the heel portion of the main plate, substantially as described.

4. In an arch-prop or instep-support the combination of a main plate curved to fit the arch of the instep having one side upturned to fit the side curve of the instep and having a heel portion, an auxiliary plate secured to the upper face of the main plate and having a heel portion and a cushion of resilient material secured to the under side of the heel portion of the auxiliary plate and resting on but not secured to the heel portion of the main plate, substantially as described.

5. In an arch-prop or instep-support the combination of a main plate curved to fit the arch of the instep having one side upturned to fit the side curve of the instep and having a heel portion, an auxiliary plate secured to the upper face of the main plate and having a heel portion, a cushion of resilient material between the heel portion of the auxiliary plate and the heel portion of the main plate and a covering of non-metallic material curved to fit the upper face of the main plate and overlying the auxiliary plate and main plate substantially as described.

6. In an arch-prop or instep-support the combination of a main plate curved to fit the arch of the instep having one side upturned to fit the side curve of the instep and having a heel portion, an auxiliary plate above the main plate and having a heel portion extending over the heel portion of the main plate, a cushion of resilient material between the heel portion of the auxiliary plate and the heel portion of the main plate, a covering of non-metallic material curved to fit the upper face of the main plate and overlying the main plate and auxiliary plate, and a fastening device passing through the covering, auxiliary plate and main plate and securing them together substantially as described.

7. In an arch-prop or instep-support, the combination of a main plate curved to fit the arch of the instep and having one side upturned to fit the side of the instep, of an auxiliary plate also curved to fit the arch of the instep and secured to the upper face of the main plate, and a cushion interposed between a portion of the auxiliary plate and the main plate substantially as described.

8. In an arch-prop or instep-support the combination of a relatively rigid main plate shaped to fit the curve of the instep, a relatively yielding auxiliary plate also shaped to fit the arch of the instep secured on the upper face of the main plate and one or more cushions between portions of the auxiliary plate and the main plate, substantially as described.

9. In an arch-prop or instep-support the combination of a relatively rigid main plate shaped to fit the curve of the instep, a relatively yielding auxiliary plate also shaped to fit the arch of the instep secured on the upper face of the main plate and one or more cushions between portions of the auxiliary plate and the main plate and a covering of nonmetallic material overlying the auxiliary plate, substantially as described.

10. In an arch-prop or instep-support the combination of a main plate shaped to fit the arch of the instep and provided on its side with resilient tongues, an auxiliary plate of resilient material also shaped to fit the arch of the instep and provided on its side with resilient tongues, and a cushion between the resilient tongues of the auxiliary plate and main plate, substantially as described.

11. In an instep-support, a main plate curved to fit the arch of the instep and having its edge on one side curved downward as shown at 4 the curve being greatest about midway of the plate and gradually disappearing toward the ends of the plate, said downward curve being distinct from the gradual or normal downward trend of the plate toward its lower edge.

12. In an instep-support a main plate curved to fit the arch of the instep, having one side upturned to fit the side arch of the instep and having the edge of its opposite side curved downward as shown at 4, the curve being greatest about midway of the length of the plate and gradually disappearing toward the ends of the plate, said downward curve being distinct from the gradual or normal downward trend of the plate toward its lower edge.

In witness whereof I affix my signature in the presence of two witnesses.

JAMES W. ARROWSMITH.

Witnesses:
WM. A. DALY,
MARY BERKOWITZ.